(12) United States Patent
Lee

(10) Patent No.: US 7,367,701 B2
(45) Date of Patent: May 6, 2008

(54) HEADLIGHT ASSEMBLY STRUCTURE FOR A MOTORCYCLE

(75) Inventor: Chia-Hsien Lee, Chunli (TW)

(73) Assignee: Yamaha Motor Co., Ltd. (JP)

( * ) Notice: Subject to any disclaimer, the term of this patent is extended or adjusted under 35 U.S.C. 154(b) by 234 days.

(21) Appl. No.: 11/166,720

(22) Filed: Jun. 24, 2005

(65) Prior Publication Data
US 2006/0062003 A1 Mar. 23, 2006

(30) Foreign Application Priority Data
Sep. 22, 2004 (TW) .............................. 93128715 A

(51) Int. Cl.
*B62J 6/00* (2006.01)

(52) U.S. Cl. ...................... 362/476; 362/507; 362/540; 340/432; 340/475

(58) Field of Classification Search ................ 362/473, 362/474, 475, 476, 506, 507, 498, 499, 540; 340/432, 465, 475; 248/200, 300; 296/78.1; 211/87.01
See application file for complete search history.

(56) References Cited

U.S. PATENT DOCUMENTS

| | | | | |
|---|---|---|---|---|
| 4,023,853 A | * | 5/1977 | Oguma et al. ............. | 296/78.1 |
| 4,356,536 A | * | 10/1982 | Funabashi et al. .......... | 362/476 |
| 4,432,040 A | * | 2/1984 | Matsuura et al. ........... | 362/526 |
| 4,515,405 A | * | 5/1985 | Ogishima ................... | 296/78.1 |
| 4,807,919 A | * | 2/1989 | Ito ............................. | 296/37.1 |
| 5,820,254 A | * | 10/1998 | Duenas ....................... | 362/473 |
| 6,135,625 A | * | 10/2000 | Kodaira et al. ............. | 362/476 |
| 6,764,206 B1 | * | 7/2004 | Felty .......................... | 362/476 |
| 6,820,756 B2 | * | 11/2004 | Garza ....................... | 211/87.01 |
| 7,055,993 B2 | * | 6/2006 | Farrow et al. .............. | 362/469 |

FOREIGN PATENT DOCUMENTS

| | | |
|---|---|---|
| CN | 1084691 C | 5/2002 |
| CN | 1096980 C | 12/2002 |
| CN | 1138664 C | 2/2004 |
| JP | A-SHO61-175189 | 6/1986 |
| JP | 2002-234477 | 8/2002 |

* cited by examiner

*Primary Examiner*—Sandra O'Shea
*Assistant Examiner*—Gunyoung T. Lee
(74) *Attorney, Agent, or Firm*—Knobbe, Martens, Olson & Bear, LLP

(57) ABSTRACT

A motorcycle headlight assembly that has simplified structure that cost less to manufacture and assemble than a conventional headlight. The headlight assembly may enhance the rigidity of the headlight assembly and decrease the number of components. The headlight assembly can include a headlight, a right indicator, left indicator and a bodywork cover. The bodywork cover is connected to the headlight cap and configured to overlay the front part of the vehicle.

12 Claims, 4 Drawing Sheets

HEADLIGHT ASSEMBLY STRUCTURE FOR A MOTORCYCLE

PRIORITY INFORMATION

The present application is based on and claims priority under 35 U.S.C. § 119(a-d) to Taiwanese Patent Application No. 093128715, filed on Sep. 22, 2004, the entire contents of which is expressly incorporated by reference herein.

BACKGROUND OF THE INVENTIONS

1. Field of the Inventions

The inventions relate to a headlight assembly structure for motorcycles, especially to a headlight assembly structure for scooter-type motorcycles.

1. Description of the Related Art

Scooter-type motorcycles are often used for transportation. These motorcycles can easily maneuver in high traffic areas and are convenient to park. Motorcycles typically have headlights for increasing the motorcycle driver's visibility and/or for alerting other people to the presence of the motorcycle. Turn indicators of the motorcycle can be used to inform other drivers that the motorcycle is going to change lanes, make a turn, and the like.

FIGS. 1 and 2 illustrate a conventional headlight assembly for scooter motorcycles. A headlight cap covering 80 is formed by matching and mounting several covers, such as a headlight cap 81, a pair of indicator-mounting covers on the two sides of the cap 81, and a bodywork cover 83. FIG. 2 illustrates an indicator-mounting cover 82 assembled with a corresponding indicator 84. Although not illustrated, another indicator-mounting cover 82 and indicator 84 can be positioned on the other side of the cap 81. The indicator-mounting covers and corresponding indicators are then matched with the headlight cap 81 and bodywork cover 83 and fixed by screw(s), thereby forming a headlight cap assembly.

With continued reference to FIG. 2, a bracket 85 is used hold the pair of indicators. To couple the indicators (e.g., the indicator 84) to the bracket 85, the locking part 86 can be passed through a hole 87 of the bracket 85. Nuts 88 can be threadably coupled to the locking part 86 to securely attach the indicator 84 to the bracket 85. A power wire 89 can extend inwardly from each locking part, such as the locking part 86. The wires 89a, 89b can converge and meet at the middle of the bracket 85 and are used to provide power from a power supply to the indicators.

Unfortunately, the illustrated headlight cap covering 80 is assembled by matching and mounting the headlight cap 81, the pair of indicator-mounting covers on the two sides of the headlight, the bodywork cover 83, etc. Therefore, the headlight assembly is a complex assembly with many components and, thus, may be difficult and extremely time-consuming to assemble. Additionally, gaps may be formed between components of the headlight assembly due to manufacturing tolerances and/or inappropriate component arrangement and assembly. Furthermore, some regulatory schemes for motorcycle fixtures may require that the indicators be separated by a relatively large distance, resulting in relatively large moments being applied to the headlight cap covering 80. After extended use, the jointed components may become loose, and the indicators may sway, therefore adversely influencing the overall rigidity of the headlight assembly. Additionally, conventional headlight assemblies may have an unsuitable appearance and may not be waterproof.

Additionally, the indicators of conventional headlight assemblies are often fixed by an elongated member, such as the bracket 85. The pair of indicators and the bracket 85 may be moved rearwardly to avoid contacting the headlight 90. However, this increases the longitudinal length of the headlight cap and the overall size of the headlight cap covering 80.

Furthermore, as shown in FIG. 2, the power wires 89a, 89b of the pair of indicators may be bent near the middle of the bracket 85. The bent portions of the power wires 89a, 89b may be vulnerable and be prone to damaged. For example, the power wires 89a, 89b may become worn during the manufacturing process and/or aftermarket maintenance.

SUMMARY OF THE INVENTION

An aspect of the present invention includes a headlight assembly structure that is a portion of a motorcycle. The headlight assembly structure can have a relatively low number of components, improved rigidity, and/or improved overall strength. The headlight assembly structure can have a relatively low cost and simple structure.

In accordance with one aspect of the present invention, a scooter-type motorcycle has a headlight assembly structure. The headlight assembly structure comprises a headlight, a pair of indicators, a bodywork cover, and a forward cowling. The forward cowling defines a headlight cap which covers the headlight and is connected to the bodywork. The forward cowling and the bodywork cover are configured to overlay a front part of the motorcycle. The headlight and the pair of indicators are directly coupled to the headlight cap.

Another aspect of the present invention includes a motorcycle with a headlight assembly structure comprising a bracket having a right end and a left end. A cowling is configured to overlay a front part of the motorcycle. A headlight is housed within the cowling. The cowling is interposed between a right indicator and the right end of the bracket and between a left indicator and the left end of the bracket. The right indicator is coupled to the right end of the bracket and the left indicator is coupled to the left end of the bracket.

In some aspects, a method of producing a scooter-type motorcycle is provided. The method comprises positioning a headlight in a headlight cap. The headlight is secured to the headlight cap with at least one fastener. A bracket with a first hole at one end and a second hole at another end is provided. The bracket is positioned along an inner surface of the headlight cap such that the first and second hole are positioned at opposing sides of the headlight cap. A first indicator having a first locking part and a first power wire and a second indicator having a second locking part and a second power wire are provided. The first locking part and the first power wire are passed through the first hole. The second locking part and the second power wire are passed through the second hole.

According to some aspects, the headlight and the pair of indicators are all disposed on the headlight cap. The headlight assembly structure has a reduced number of components and can be easily installed. Thus, the headlight assembly structure does not have to be assembled on a production line for the motorcyles. Instead, the headlight assembly structure may be sub-assembled before being sent to the motorcycle production line, thus the delay along the motorcycle production line will be reduced. In addition, the headlight assembly structure may be assembled in a relatively short production time, because its components can be accurately matched and assembled. Additionally, when the headlight assembly structure is assembled, few or no gaps may be formed between its components.

BRIEF DESCRIPTION OF THE DRAWINGS

The above and other features, aspects and advantages of the present invention will now be described with reference to drawings that show a presently preferred arrangement that is intended to illustrate and not to limit the present invention and in which drawings.

DETAILED DESCRIPTION OF THE PREFERRED EMBODIMENTS

Figure 1:
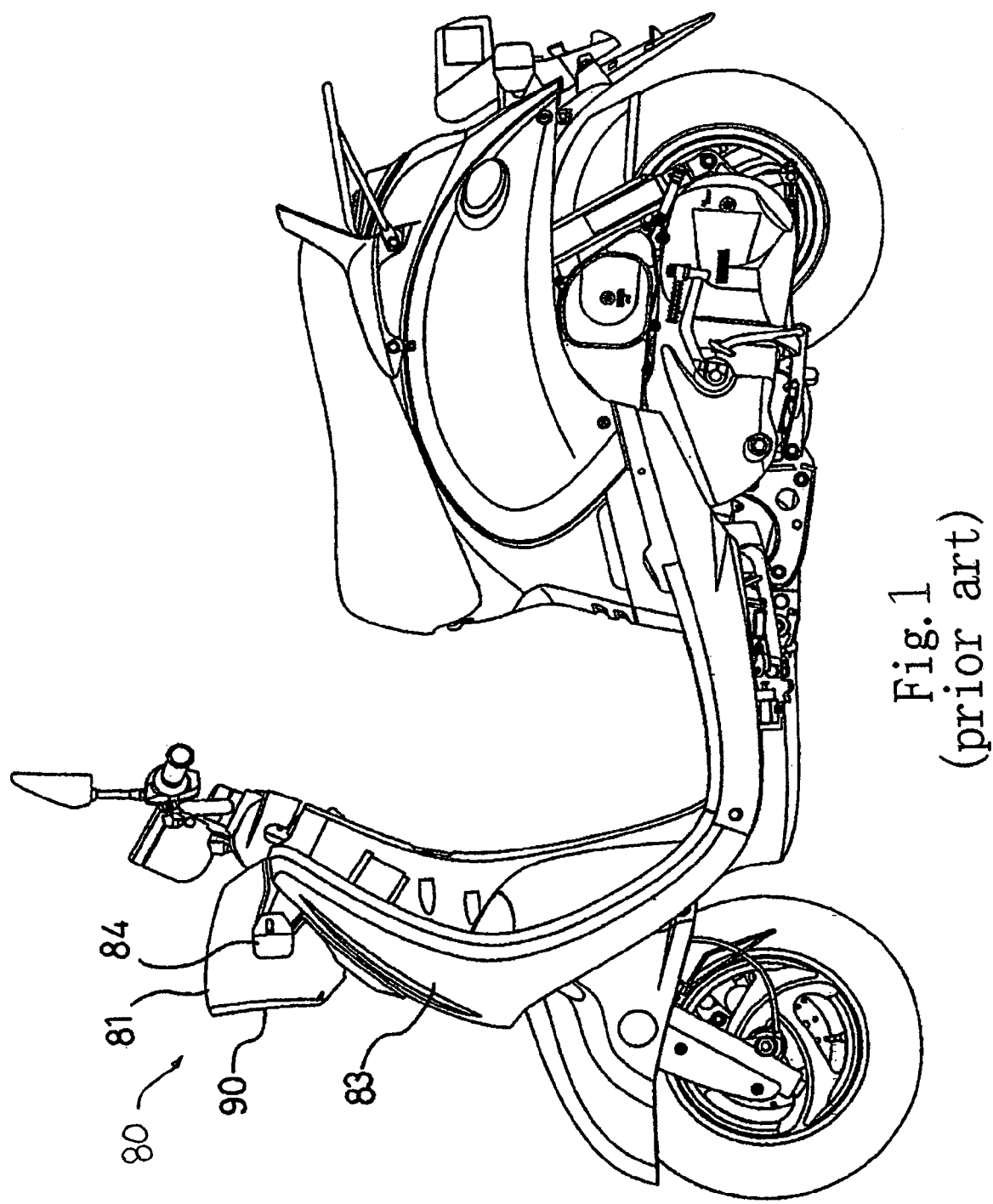
FIG. 1 is a side view of a conventional scooter-type motorcycle having a headlight assembly.
Figure 2:
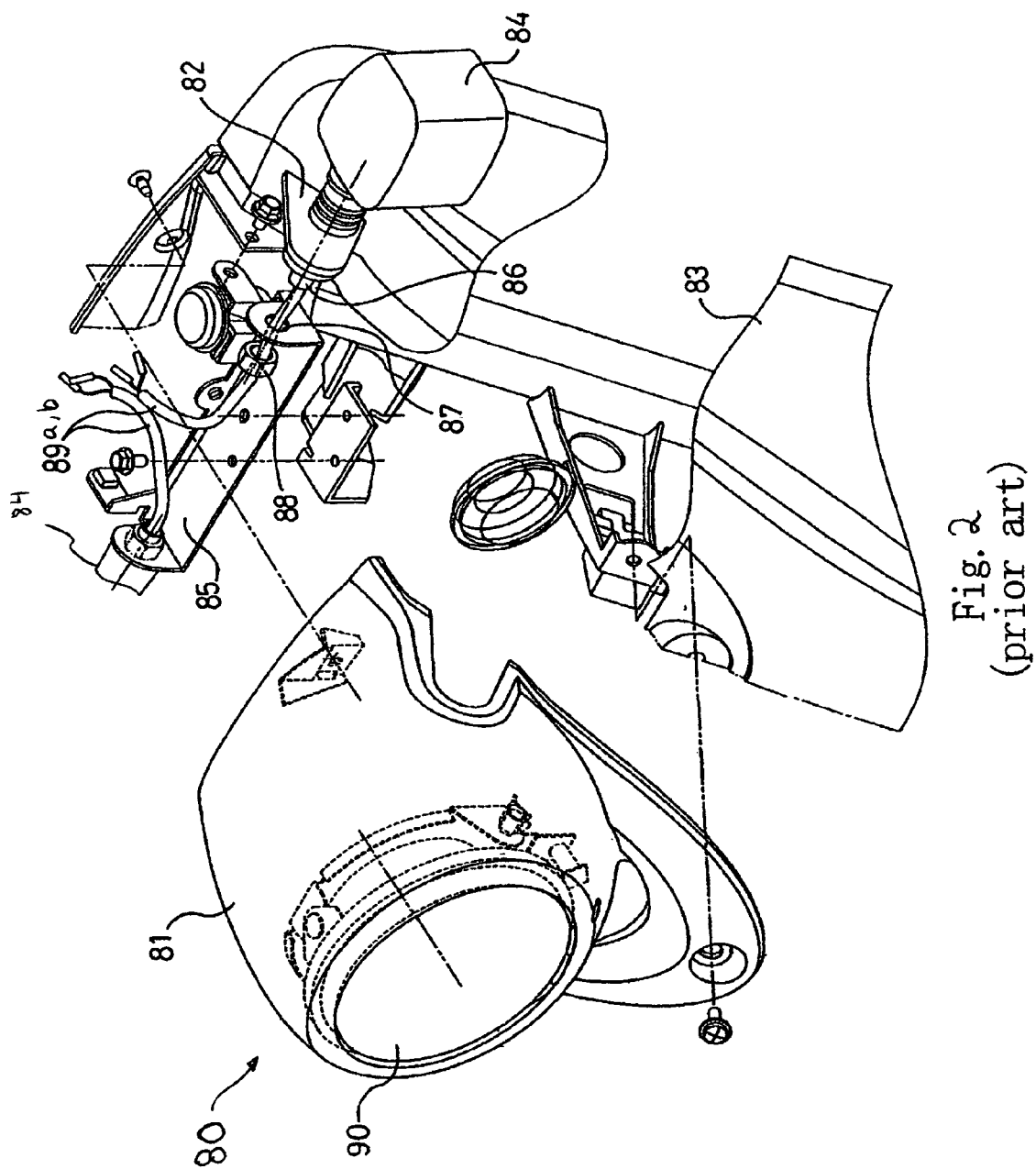
FIG. 2 is an enlarged exploded perspective view of the conventional headlight assembly of FIG. 1.
Figure 3:
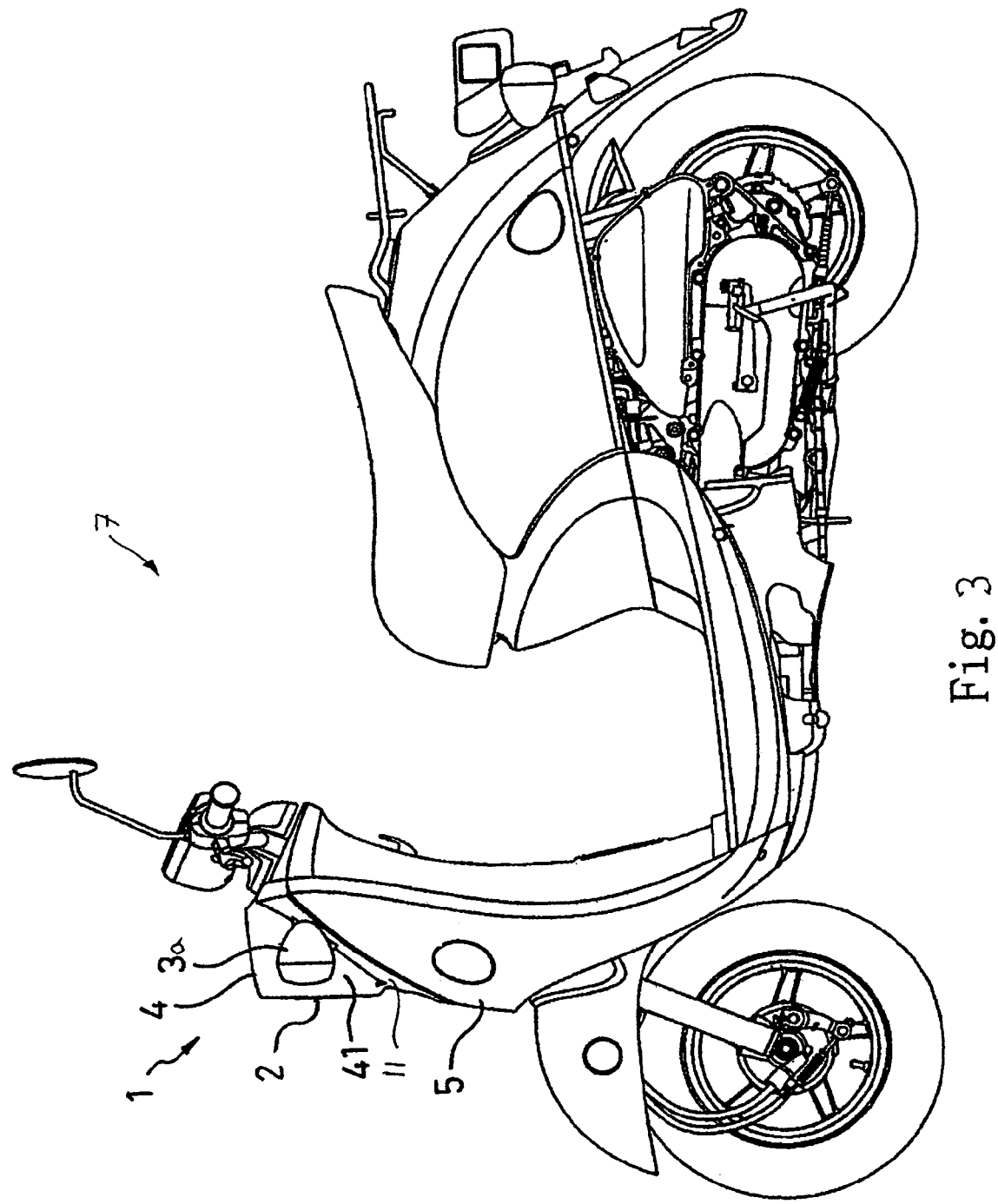
FIG. 3 is a side view of a scooter-type motorcycle having a headlight assembly structure.
Figure 4:
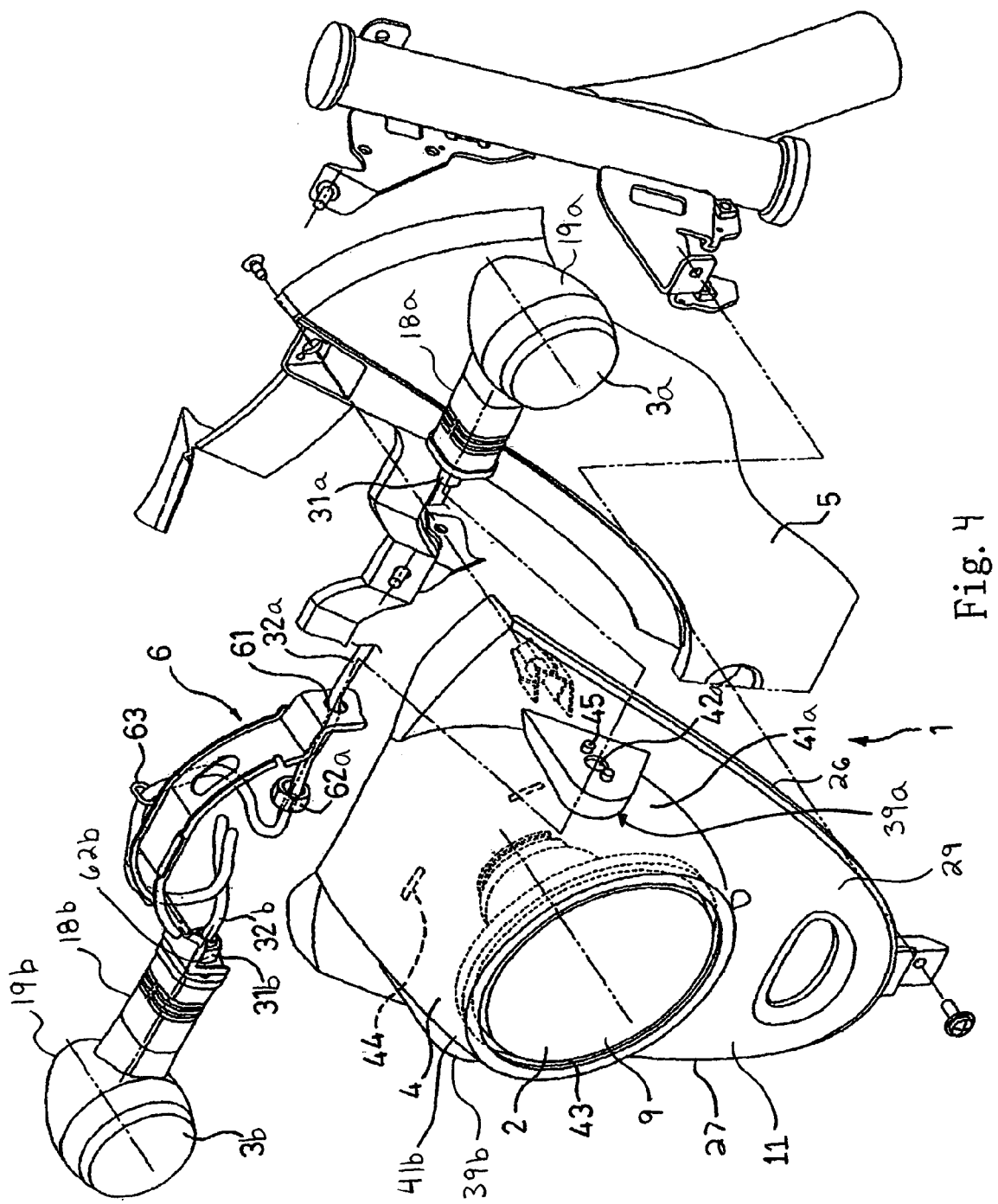
FIG. 4 is an enlarged exploded perspective view of the headlight assembly structure of FIG. 3.

The following is a detailed description of one embodiment of a motorcycle 7, with reference to FIGS. 3 and 4. As used herein, the term "motorcycle" is a broad term and is used in its ordinary meaning and includes, without limitation, scooters (e.g., scooter-type motorcycles including mopeds), motorbikes, and the like. As used herein, the terms "motorcycle" and "scooter-type motorcycle" may be used interchangeably. While the headlight assembly structure 1 is illustrated as employed on a scooter-type motorcycle, the headlight assembly structure can also be used on other types of motorcycles, all-terrain vehicles ("ATV"), snowmobiles, or other transportation vehicles. For the sake of convenience, the described headlight assembly structure 1 is mounted to a scooter-type motorcycle. In the following description, the terms "front," "rear," "left," and "right" are used to describe the motorcycle 7 and its various components as viewed by a rider seated in a normal riding position.

As shown in FIG. 4, the headlight assembly structure 1 includes a headlight 2, a pair of indicators 3a, 3b, and a forward cowling 11 defining a headlight cap 4. A bodywork cover 5 can be connected to the forward cowling 11. As shown in FIGS. 3 and 4, the forward cowling 11 and bodywork cover 5 can cooperate to overlay the front part of the motorcycle 7.

With continued reference to FIG. 4, the headlight cap 4 is configured to house one or more headlights 2. In some embodiments, including the illustrated embodiment, the headlight cap 4 surrounds and houses at least a portion of a single headlight 2. The headlight 2 may be a projector type headlight or other type of headlight known in the art. The headlight 2 may include a lamp body positioned and extending rearwardly of a forward facing opening 9 of the forward cowling 11.

The headlight cap 4 can comprise a pair of cowling sides 41a, 41b, which preferably extend forwardly from a front face 29 of the forward cowling 11. The headlight cap 4 may be forwardly tapered and may have a generally circular cross-sectional profile as viewed from the front of the motorcycle 7. The headlight cap 4 can have any suitable configuration for housing one or more headlights 2. Additionally, the headlight assembly structure 1 can comprise a plurality of headlight caps 4, each containing at least one headlight.

One or more of the indicators can be spaced from the illustrated headlight cap 4. The illustrated motorcycle 7 has a pair of indicators 3a, 3b. As used herein, the term "indicator" is a broad term and is used in its ordinary meaning and includes, without limitation, turn/signal indicators and the like. In the illustrated embodiment, the headlight cap 4 is interposed between the indicators 3a, 3b.

The indicators 3a, 3b can be generally similar to each other and, accordingly, the following description of one of the indicators applies equally to the other, unless indicated otherwise. The indicator 3a has an elongated arm 18a extending between an indicator signal 19a and a locking part 31a. The indicator signal 19a may comprise a light source used for signaling. The light source can be positioned within and protected by an indicator housing.

The headlight assembly structure 1 can include one or more forward brackets or bosses 39a, 39b each configured to receive and engage a corresponding indicator 3a, 3b. In the illustrated embodiment, each bracket 39a, 39b is positioned between the headlight cap 4 and an edge of the forward cowling 11. For example, the bracket 39a is interposed between the left side cowling 41a and a left edge 26 of the forward cowling 11. The bracket 39b is interposed between the right side cowling 41b and a right edge 27 of the forward cowling 11. The brackets 39a, 39b can be attached to the headlight cap 4 and/or the front face 29 of the forward cowling 11. For example, the brackets 39a, 39b can be connected to and extend laterally from a corresponding side 41a, 41b of the headlight cap 4. The brackets 39a, 39b can be any suitable mounting structure for engaging an indicator.

The forward brackets 39a, 39b can be removably or permanently attached to the forward cowling 11. The forward cowling 11 and forward brackets 39a, 39b can have a one-piece construction. In some embodiments, the forward brackets 39a, 39b and the forward cowling 11 form a unity or monolithic body. Alternatively, the forward cowling 11 and the forward brackets 39a, 39b can have a multi-piece construction. For example, the forward brackets 39a, 39b can be mounted to the forward cowling 11 by screw(s), nut and bolt assemblies, and the like.

The pair of indicators 3a, 3b is coupled to the headlight cap 4 via the brackets 39a, 39b, respectively. The brackets 39a, 39b can have one or more structures for engaging the indicators. In some aspects, each of the forward brackets 39a, 39b comprises one or more holes 42 that preferably extend through the associated bracket 39a, 39b and the forward cowling 11. The illustrated brackets 39a, 39b each comprise a single hole 42. The indicators 3a, 3b can be fixed relative to the headlight cap 4. Any suitable attachment system or device can be used to couple the indicators 3a, 3b to the forward brackets 39a, 39b, respectively. The indicator 3a can be mounted to the forward bracket 39a by inserting the locking part 31a and the associated power wire 32a through the hole 42a. The locking part 31a can comprise an externally threaded member sized to pass conveniently through the corresponding hole 42a and engage a nut. The nut can secure the locking part 31a to the forward cowling 11. The indicator 3b can be mounted to the bracket 39b in a similar manner.

A bracket 6 is preferably configured to be positioned between the headlight cap 4 and at least a portion of the headlight 2, preferably within the headlight cap 4. The bracket 6 can be configured to extend between the locking parts 31a, 31b when the indicators 3a, 3b are attached to the forward cowling 11. As shown in FIG. 4, the bracket 6 in the illustrated embodiment includes an elongated curved body shaped to pass along the inner surface of the headlight cap 4. The illustrated bracket 6 has a somewhat U-shape. Alternatively, the bracket 6 can have a curved shape (e.g., semi-circular), angled shape, and/or other suitable shape. In some aspects, the bracket 6 is formed by bending or molding a material into a desired shape.

Each side of the bracket 6 has a hole for receiving the corresponding locking part and the power wire extending therefrom. For example, the illustrated bracket 6 has a hole 61 that receives the locking part 31a and the power wire 32a. Each of the locking parts 31a, 31b is preferably locked to the bracket 6 by a nut 62a, 62b, respectively. The connection between the indicators 3a, 3b and the forward cowling 11 results in enhanced rigidity, overall strength, and/or the absorption of vibrations from the pair of indicators 3a, 3b. The design can also reduce and/or prevent cracking or damage of the forward cowling 11 and enhance the appearance around joined parts.

In addition, when replacing a bulb of the headlight 2, or during aftermarket repairs, there is no need to dismount the bracket 6 or the indicators 3a, 3b. The headlight 2 can be replaced or repaired while the bracket 6 remains along the inner surface of the headlight cap 4, thus significantly enhancing the convenience of maintaining the headlight 2.

One or more fasteners 63 can be connected to the bracket 6 and configured to hold one or more wires. The illustrated fastener 63 has an elongated shape and may be formed on the sides of the bracket 6 to fasten and guide an associated power wire 32a along the side of the bracket 6. Each of the wires 32a, 32b extends from the respectively locking part 31a, 31b and can converge centrally and is connected to a power supply. Therefore, the headlight assembly structure allows for power wires 32a, 32b without hindering the configuration of other components. Furthermore, damage to the power wires during mounting, installation, and/or dismounting for maintenance can be reduced or avoided.

In addition, although the illustrated bracket 6 is preferably configured to be positioned in the space between the headlight cap 4 and above the headlight 2, the bracket 6 can be in other locations. For example, the bracket 6 may also be configured for positioning in the space between the headlight cap 4 and below the headlight 2, or any place between the headlight cap 4 and the headlight 2.

With continued reference to FIG. 4, the brackets 39a, 39b can include one or more positioning protrusions (e.g., the protrusion 45). The bracket 39a has a pair of protrusions 45. Each protrusion 45 can be spaced from, but preferably proximate to, a corresponding hole 42. The protrusions 45 can be used to position the indicators 3a, 3b. The brackets 39a, 39b each have a pair of protrusions 45. However, any suitable number of protrusions 54 can be used.

One embodiment of assembling the headlight assembly structure 1 is described below. During mounting, the headlight 2 is first placed in the headlight cap 4 and adjusted to an appropriate position. After positioning, the headlight 2 is locked to the headlight cap 4 with bolts. After that, the bracket 6 can be positioned, preferably keyed, on the inner surface of headlight cap 4 and adjusted to an appropriate position according to the mounting position of the locking parts 31a, 31b and other components. Each locking part 31a, 31b and associated power wire 32a, 32b is passed through the hole of the corresponding bracket 39a, 39b. The illustrated locking part 31a and power wire 32a are passed through the hole 42 and the hole 61 of the bracket 6. The locking parts 31a, 31b are secured to the bracket 6 by nuts 62a, 62b. Each power wire 32a, 32b is configured to extend along the surface of the bracket 6 and is preferably connected to a power supply. The power wire 32a is held to the bracket 6 by an optional fastener 63.

A headlight mounting structure 43 preferably is formed by the headlight cap 4 to facilitate the assembly process. The mounting structure 43 can be a gimbal system (e.g., a rim pivot gimbal) formed on the inner surface of the headlight cap 4 to locate the headlight 2, preferably temporarily. Thus, during mounting, the headlight 2 may be positioned relative to the headlight mounting structure 43 to locate the headlight 2, whereby the headlight 2 may swing fore and aft slightly, or move along a circular path so as to adjust the position of the bracket 6. The headlight mounting structure 43 can be any suitable structure for positioning the headlight 2. After positioning, the headlight 2 is locked to the headlight cap 4 with fasteners (e.g., one or more nut and bolt assemblies, set screws, etc.) or other mounting structure or devices. Thus, convenience and accuracy during mounting and positioning are improved by the headlight mounting structure 43.

In addition, one or more bracket stoppers 44 are optionally formed on the inner surface of the headlight cap 4 to locate bracket 6, preferably temporarily. During mounting, the bracket 6 may engage the bracket stopper 44 to locate bracket 6. The stopper 44 can be a recess or protrusion along the interior surface of the headlight cap 4. The bracket 6 can have structure (e.g., a recess, protrusion, etc.) configured to mate with the stopper 44. The bracket 6 can be rigidly mounted to the forward cowling 11. In other embodiments, there can be play between the bracket 6 and the forward cowling 11 to allow some movement of the bracket 6. After being adjusted to a desired position in accordance with the mounting position of the locking parts 31a, 31b and other components, the locking parts 31a, 31b are locked to the bracket 6. Thus, convenience and accuracy during mounting and positioning are enhanced by using the bracket stopper 44.

In addition, the headlight 2 and the pair of indicators 3a, 3b are preferably approximately horizontally positioned relative to the ground. Therefore, visual identification of the vehicle's light signals is improved. In other embodiments, the indicators 3a, 3b are vertically offset from the headlight 2. In view of the present disclosure, a skilled artisan can select the desired position of the headlight 2 and the indicators 3a, 3b.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A scooter-type motorcycle with a headlight assembly structure, the headlight assembly structure comprising:
   a headlight;
   a pair of indicators comprising a first indicator and a second indicator, wherein the first indicator comprises a body having a first end and a second end, a lens connected to the first end of the body, and a fitting connected to the second end of the body;
   a bracket having a first end and a second end, wherein the first indicator is fitted to a first end of the bracket;
   a bodywork cover; and
   a forward cowling defining a headlight cap which covers the headlight and is connected to the bodywork cover, the forward cowling and the bodywork cover being configured to overlay a front part of the motorcycle, and the headlight and the pair of indicators being directly coupled to the headlight cap;
   wherein the headlight is mounted to the headlight cap and at least portions of the pair of indicators extend through the headlight cap and are coupled to the bracket, the bracket being disposed inside the headlight cap along an inner surface of the headlight cap.

2. The scooter-type motorcycle of claim 1, wherein the bracket is positioned between the headlight cap and the headlight.

3. The scooter-type motorcycle of claim 1, wherein a bracket stopper is formed on an inner surface of the headlight cap and is configured to temporarily locate the bracket.

4. The scooter-type motorcycle of claim 1, wherein a fastener is formed on the bracket to fasten and guide at least one power wire extending from a locking part of one of the indicators.

5. The scooter-type motorcycle of claim 1, wherein at least one headlight mounting structure is formed on an inner surface of the headlight cap to temporarily locate the headlight.

6. The scooter-type motorcycle of claim 1, wherein openings are formed through the headlight cap, each opening is adapted to receive an elongated member of one of the indicators.

7. The scooter-type motorcycle of claim 1, wherein locking parts of the pair of indicators extend inwardly and pass through the headlight cap.

8. The scooter-type motorcycle of claim 1, wherein the headlight and the pair of indicators are generally horizontally aligned relative to the ground when the scooter-type motorcycle is substantially upright.

9. The scooter-type motorcycle of claim 1, wherein the forward cowling has side cowlings extending in a longitudinal direction, and the pair of indicators are mounted to the side cowlings.

10. The scooter-type motorcycle of claim 1, wherein at least one positioning protrusion is formed on an external surface of the forward cowling to position at least one of the indicators.

11. The scooter-type motorcycle of claim 1, wherein a first forward bracket and a second forward bracket extend forwardly from the forward cowling, and the headlight cap is positioned between the first and second forward brackets.

12. The scooter-type motorcycle of claim 11, further comprising:
   a first hole that extends through the headlight cap and the first forward bracket;
   a second hole that extends through the headlight cap and the second forward bracket; and
   a portion of each indicator being disposed through one of the holes and coupled to one end of a bracket positioned within the headlight cap so as to directly couple the indicators to the headlight cap.

* * * * *